(12) United States Patent
Monroe

(10) Patent No.: US 11,598,695 B2
(45) Date of Patent: Mar. 7, 2023

(54) ALTERNATOR AND STARTER MOTOR TEST FIXTURE

(71) Applicant: Dana Monroe, Portland, OR (US)

(72) Inventor: Dana Monroe, Portland, OR (US)

( * ) Notice: Subject to any disclaimer, the term of this patent is extended or adjusted under 35 U.S.C. 154(b) by 294 days.

(21) Appl. No.: 17/028,099

(22) Filed: Sep. 22, 2020

(65) Prior Publication Data

US 2021/0088411 A1 Mar. 25, 2021

Related U.S. Application Data

(60) Provisional application No. 62/904,458, filed on Sep. 23, 2019.

(51) Int. Cl.
*G01M 15/02* (2006.01)
*H02K 5/00* (2006.01)
*H02K 11/20* (2016.01)

(52) U.S. Cl.
CPC .............. *G01M 15/02* (2013.01); *H02K 5/00* (2013.01); *H02K 11/20* (2016.01)

(58) Field of Classification Search
CPC ................................ G01M 15/02; H02K 11/20
See application file for complete search history.

(56) References Cited

U.S. PATENT DOCUMENTS

| 3,936,744 | A | | 2/1976 | Perlmutter |
| 4,155,537 | A | * | 5/1979 | Bronson ................. B60P 7/083 242/388.3 |
| 4,666,122 | A | | 5/1987 | Goodard |
| 4,849,665 | A | | 7/1989 | Kitamura et al. |
| 4,945,272 | A | | 7/1990 | Ochi et al. |
| 4,980,589 | A | | 12/1990 | Ochi et al. |
| 5,094,435 | A | | 3/1992 | Depperman et al. |
| 5,550,485 | A | | 8/1996 | Falk |
| 5,705,870 | A | | 1/1998 | Thomsen et al. |
| 5,845,370 | A | * | 12/1998 | Cohoon ................ B60P 7/0823 24/200 |
| 5,938,169 | A | | 8/1999 | Ogawa et al. |
| 6,147,426 | A | | 11/2000 | Lepi et al. |
| 6,304,012 | B1 | | 10/2001 | Chen et al. |
| 6,304,016 | B1 | | 10/2001 | Frederick et al. |
| 6,405,585 | B1 | * | 6/2002 | Hewitt ................ G01M 15/044 73/116.05 |
| 7,134,324 | B2 | | 11/2006 | Krampitz et al. |
| 7,134,325 | B2 | | 11/2006 | Krampitz et al. |
| 7,284,416 | B2 | | 10/2007 | Krampitz et al. |

(Continued)

*Primary Examiner* — Eric S. McCall
(74) *Attorney, Agent, or Firm* — Joseph P. Curtin, L.L.C.

(57) ABSTRACT

A rotating-machine test fixture includes a base, a flexible member and a wedge member. The base includes a longitudinal axis and receives a rotating machine so that an axis of rotation of the rotating machine is aligned in a direction that is substantially parallel to the longitudinal axis of the base. The flexible member includes a first end attached to the base at a first location and a second end slidably attached to the base at a second location to hold the received rotating machine against the base. The wedge member is coupled to the base and moves in a direction that is substantially parallel to the longitudinal axis of the base. The wedge member may be selectably positioned between the received rotating machine and the base to align the axis of rotation of the rotating machine to be substantially parallel to the longitudinal axis of the base.

20 Claims, 17 Drawing Sheets

(56) References Cited

U.S. PATENT DOCUMENTS

| | | |
|---|---|---|
| 8,226,008 B2 | 7/2012 | Raichle et al. |
| 8,310,271 B2 | 11/2012 | Raichle et al. |
| 8,312,668 B2 | 11/2012 | Kincel |
| 8,903,595 B2 | 12/2014 | Miller et al. |
| 9,206,782 B2 | 12/2015 | Chinnadurai et al. |
| 9,797,956 B2 | 10/2017 | Samp et al. |
| 10,055,711 B2 | 8/2018 | Simon et al. |
| 10,193,413 B2 | 1/2019 | Samp |
| 10,317,468 B2 * | 6/2019 | Bertness ................. G01R 31/34 |
| 2002/0030133 A1 * | 3/2002 | Ratzlaff ................ B60P 7/0846 |
| | | 242/388.6 |
| 2006/0090554 A1 | 5/2006 | Krampitz et al. |
| 2008/0023547 A1 | 1/2008 | Raichle et al. |
| 2013/0297247 A1 | 11/2013 | Jardine |
| 2014/0260577 A1 | 9/2014 | Chinnadurai et al. |
| 2014/0366616 A1 * | 12/2014 | Kokal ................... G01M 15/02 |
| | | 73/116.05 |
| 2016/0216335 A1 | 7/2016 | Bertness |
| 2017/0089949 A1 | 3/2017 | Migia et al. |
| 2017/0146601 A1 | 5/2017 | Mills et al. |
| 2017/0146602 A1 * | 5/2017 | Samp ...................... G01R 31/34 |
| 2021/0247271 A1 * | 8/2021 | Chin .................... F02N 11/108 |

\* cited by examiner

ALTERNATOR AND STARTER MOTOR TEST FIXTURE

CROSS-REFERENCE TO RELATED APPLICATION

This application claims the priority benefit under 35 U.S.C. § 119(e) of U.S. Provisional Application No. 62/904,458, filed on Sep. 23, 2019, the disclosure of which is incorporated herein by reference in its entirety.

TECHNICAL FIELD

The subject matter disclosed herein generally relates to a rotating-machine holding apparatus. More specifically, the subject matter disclosed herein relates to a rotating-machine holding apparatus for holding rotating machines, such as, but not limited to, alternators, generators and starter motors, for testing.

BACKGROUND

Rotating machines, such as alternators and starter motors, are used in vehicles. Alternators are typically driven by a belt that is driven by the engine of a vehicle. When rotated, alternators supply electrical power that may be used in the vehicle and/or engine. Alternators are typically removable, but are rigidly mounted via a bracket to the block of the engine or the chassis of the vehicle. Starter motors are electrical motors that are typically removable, and rigidly mounted to an engine or transmission casing, and that have an electrically driven pinion gear extending from the starter motor to engage a component, such as gears on a flywheel of the engine in order to be able to rotate the crank shaft and start the engine. It is often desirable to test alternators and/or starter motors on a test bench at a location where the alternators and/or starter motors have been removed from the vehicle. Such testing, for example, may be desirable before installing a new alternator or starter, or may be desirable when removing an existing alternator or starter for testing to diagnose vehicle problems. When testing an alternator, it is desirable to be able to attach a belt to the pulley of the alternator and drive the alternator belt with a motor so that the alternator is securely, but removably mounted, and so that a belt may be tensioned. When testing starter motors, the starter motor is typically connected to a device that provides power to the starter motor so that the motor may be selectively operated. In such situations, it is desirable to be able to securely hold the alternator or the starter motor in place in a convention location during testing.

SUMMARY

The subject matter disclosed herein provides a rotating-machine test fixture that includes a base, a flexible member and a wedge member. The base may include a longitudinal axis and may receive a rotating machine so that an axis of rotation of the rotating machine may be aligned in a direction that is substantially parallel to the longitudinal axis of the base. The received rotating machine may be an alternator or a starter motor. The flexible member may include a first end and a second end. The first end may be attached to the base at a first location and the second end may be slidably attached to the base at a second location to hold the received rotating machine against the base. The flexible member may extend in a direction that is transverse to the longitudinal axis. The wedge member may be coupled to the base and may move in a direction that is substantially parallel to the longitudinal axis of the base. The wedge member may be selectably positioned between the received rotating machine and the base to align the axis of rotation of the rotating machine to be substantially parallel to the longitudinal axis of the base. In one embodiment, the rotating-machine test fixture may include a flexible-member tensioner that receives the flexible member and that slidably attaches to the base along a direction that is substantially parallel to the longitudinal axis of the base. The flexible-member tensioner may selectably increase a tension of the flexible member as the flexible member holds the received rotating machine.

The subject matter disclosed herein provides a rotating-machine test fixture that may include a base, a flexible member and a wedge member. The base may include one or more support members that form a channel that may be oriented substantially parallel to a longitudinal axis of the base. The base may receive a rotating machine so that an axis of rotation of the rotating machine may be aligned in a direction that may be substantially parallel to the longitudinal axis of the base. The received rotating machine may be an alternator or a starter motor. The flexible member may include a first end and a second end in which the first end may be attached to the base at a first location and the second end may be slidably attached to the base at a second location to hold the received rotating machine against the base. The flexible member may extend in a direction that is transverse to the longitudinal axis. The wedge member may be coupled to the base and may move in a direction that is substantially parallel to the longitudinal axis of the base. The wedge member may be selectably positioned between the received rotating machine and the base to align the axis of rotation of the rotating machine to be substantially parallel to the longitudinal axis of the base. In one embodiment, at least one support member may be sloped with respect to the base. In another embodiment, the base may be movable to adjust a position of a received rotating machine with respect to a driver of a belt coupled to the received rotating machine.

The subject matter disclosed herein provides a rotating-machine test fixture that may include a base, a flexible member, a flexible-member tensioner, and a wedge member. The base may include one or more support members that form a channel that that may be oriented substantially parallel to a longitudinal axis of the base. The base may receive a rotating machine so that an axis of rotation of the rotating machine may be aligned in a direction that may be substantially parallel to the longitudinal axis of the base. The received rotating machine may be an alternator or a starter motor. The flexible member may include a first end and a second end in which the first end may be attached to the base at a first location and the second end may be slidably attached to the base at a second location to hold the received rotating machine against the base. The flexible member may extend in a direction that is transverse to the longitudinal axis. The flexible-member tensioner may receive the flexible member and may be slidably attached to the base along a direction that may be substantially parallel to the longitudinal axis of the base. The flexible-member tensioner may selectably increase a tension of the flexible member as the flexible member holds the received rotating machine. The wedge member may be coupled to the base and may move in a direction that may be substantially parallel to the longitudinal axis of the base. The wedge member may be selectably positioned between the received rotating machine and the base to align the axis of rotation of the rotating machine to be substantially parallel to the longitudinal axis of the base.

BRIEF DESCRIPTION OF THE DRAWINGS

The subject matter disclosed herein is illustrated by way of example and not by limitation in the accompanying figures in which like reference numerals indicate similar elements and in which.

DETAILED DESCRIPTION

Figure 1:
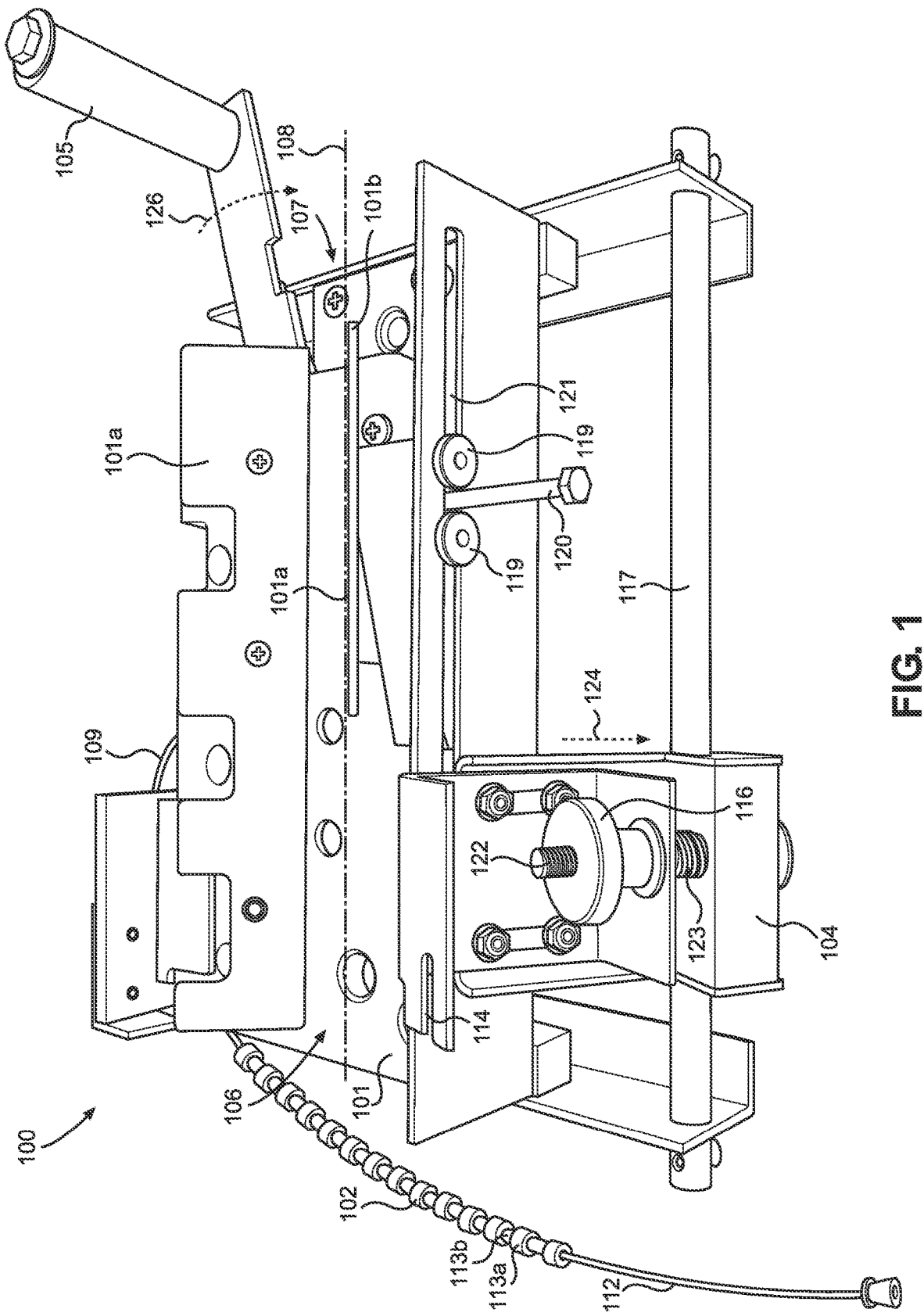
FIG. 1 shows a front side perspective view of a first example embodiment of a rotating-machine holding apparatus according to the subject matter disclosed herein.

As used herein, the word "exemplary" means "serving as an example, instance, or illustration." Any embodiment described herein as "exemplary" is not to be construed as necessarily preferred or advantageous over other embodiments. Additionally, it will be appreciated that for simplicity and/or clarity of illustration, elements illustrated in the figures have not necessarily been drawn to scale. For example, the dimensions of some of the elements may be exaggerated relative to other elements for illustrative clarity. Further, in some figures only one or two of a plurality of similar elements indicated by reference characters for illustrative clarity of the figure, whereas all of the similar element may not be indicated by reference characters. Further still, it should be understood that although some portions of components and/or elements of the subject matter disclosed herein have been omitted from the figures for illustrative clarity, good engineering, construction and assembly practices are intended.

Figure 2:
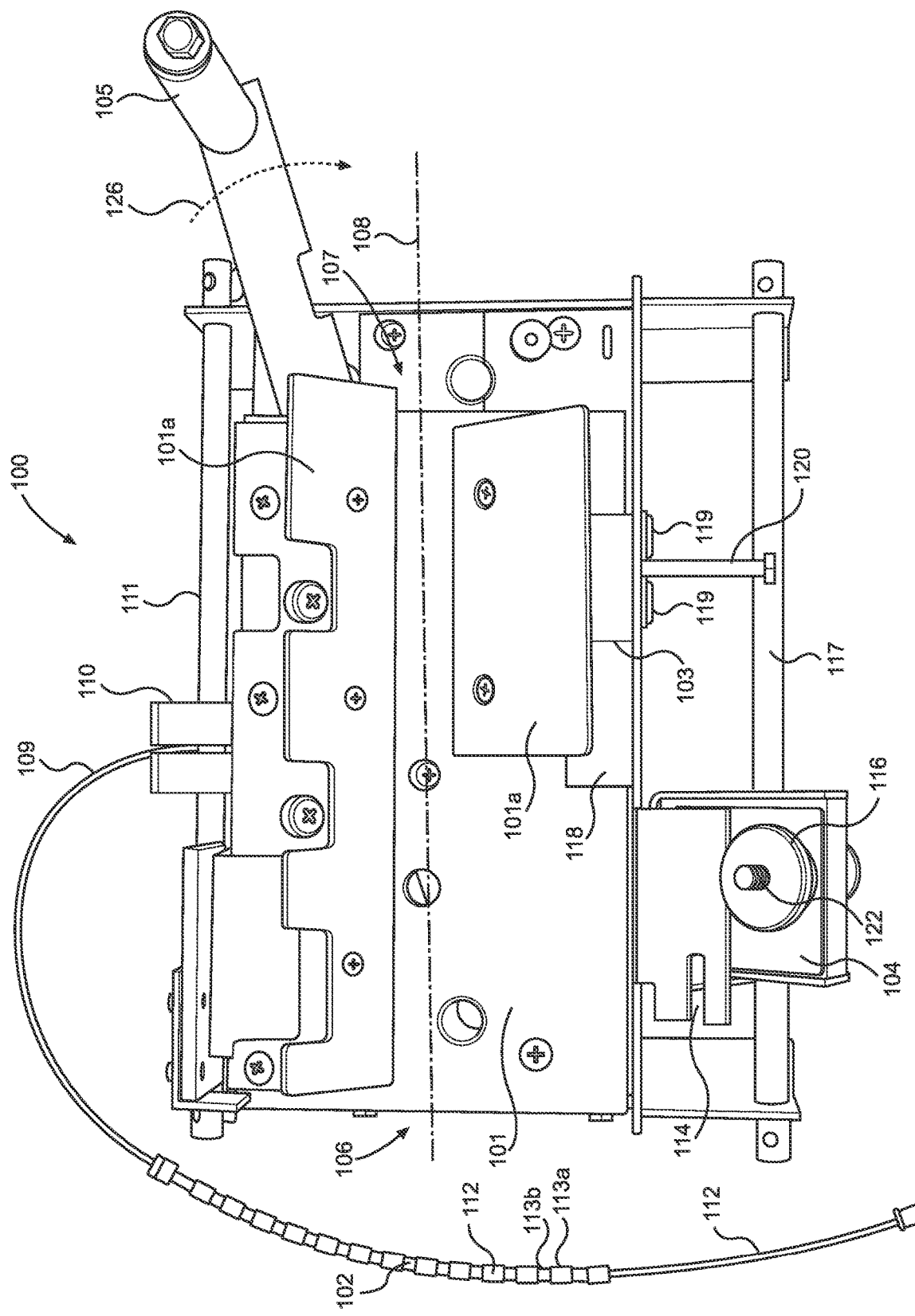
FIG. 2 shows a top view of the example embodiment of the rotating-machine holding apparatus shown in FIG. 1.
Figure 3:
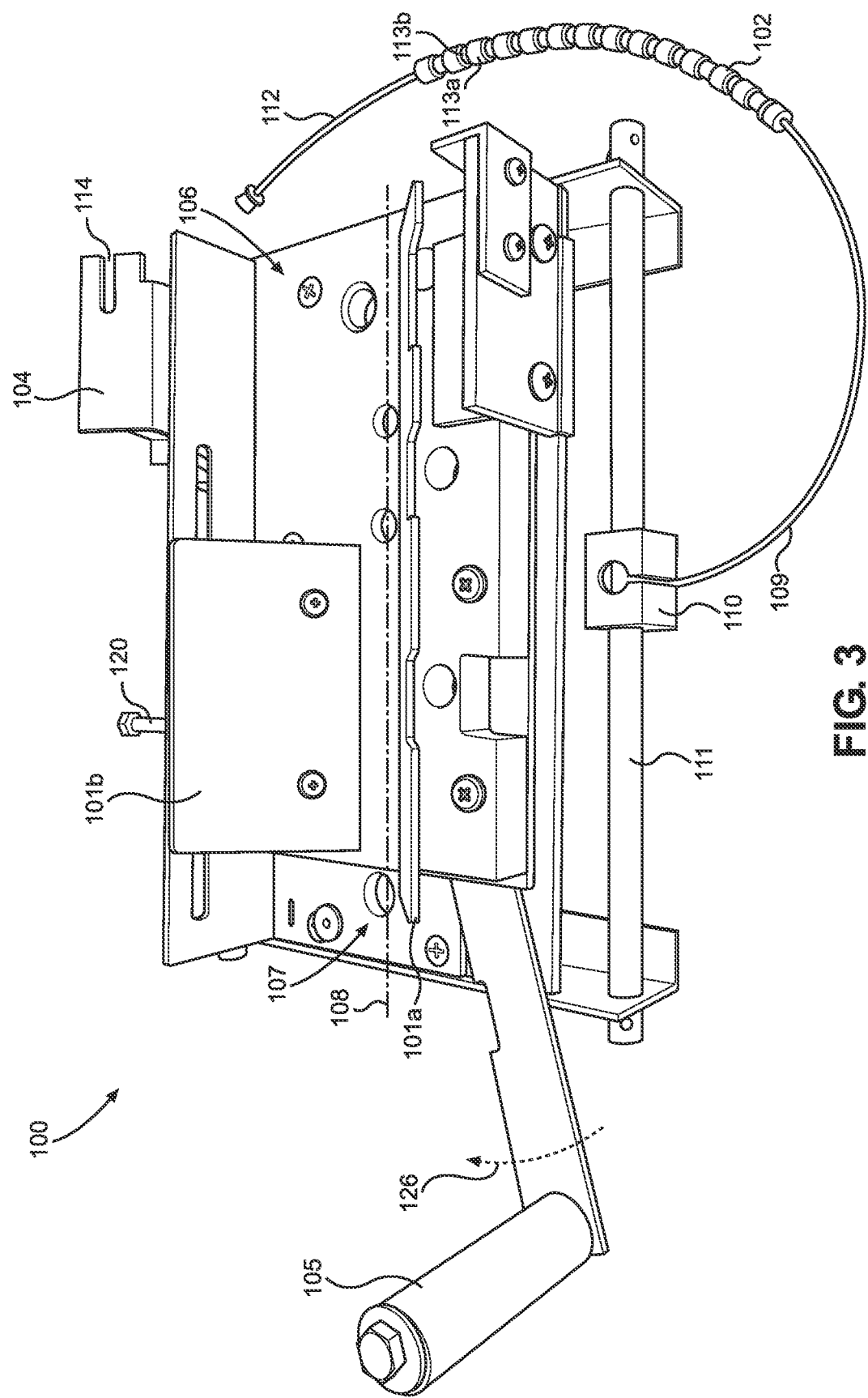
FIG. 3 shows a back side perspective view of the example embodiment of the rotating-machine holding apparatus shown in FIG. 1.
Figure 4:
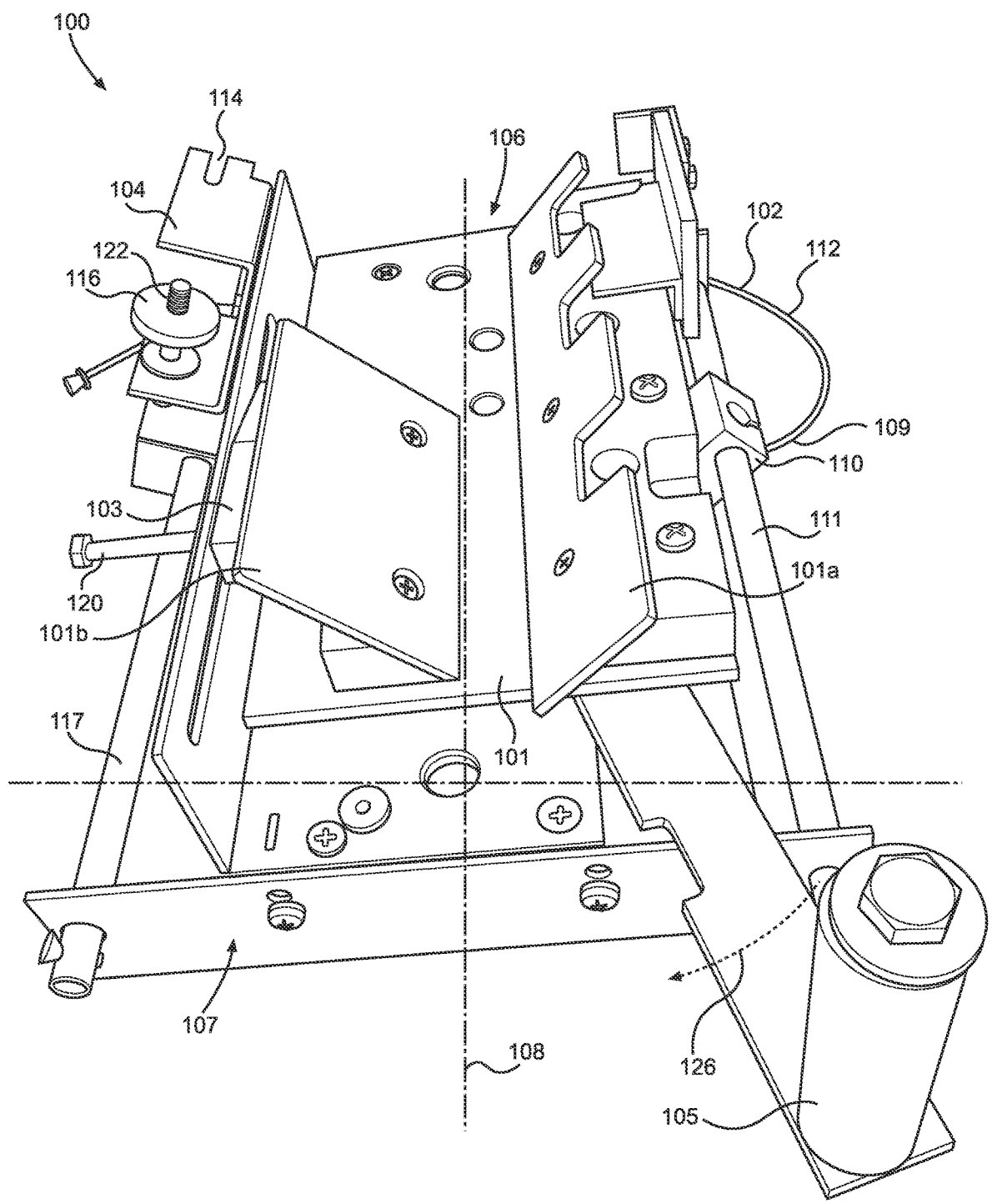
FIG. 4 shows an end view of the example embodiment of the rotating-machine holding apparatus shown in FIG. 1.
Figure 5:
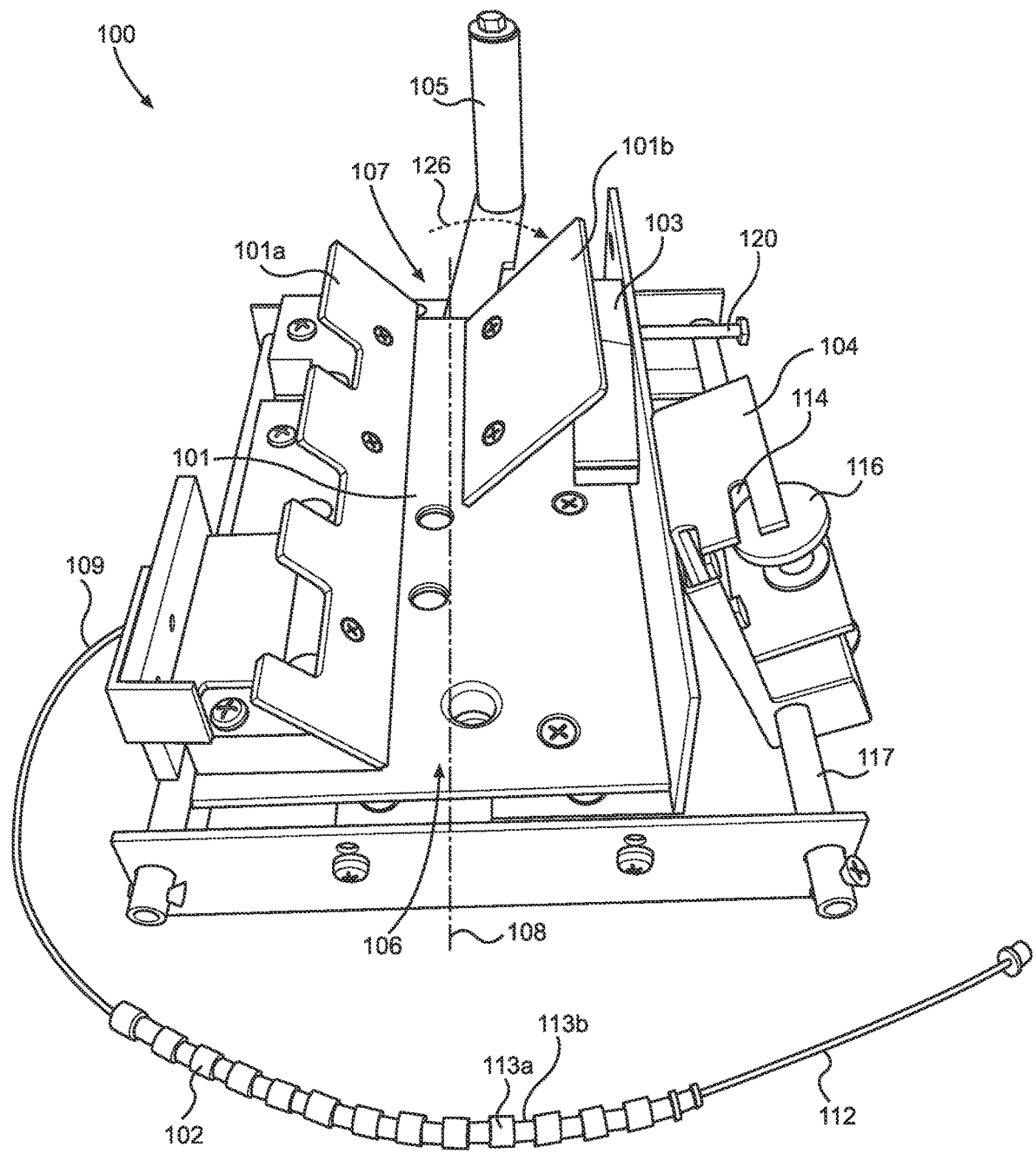
FIG. 5 shows the other end view of the example embodiment of the rotating-machine holding apparatus shown in FIG. 1.
Figure 6:
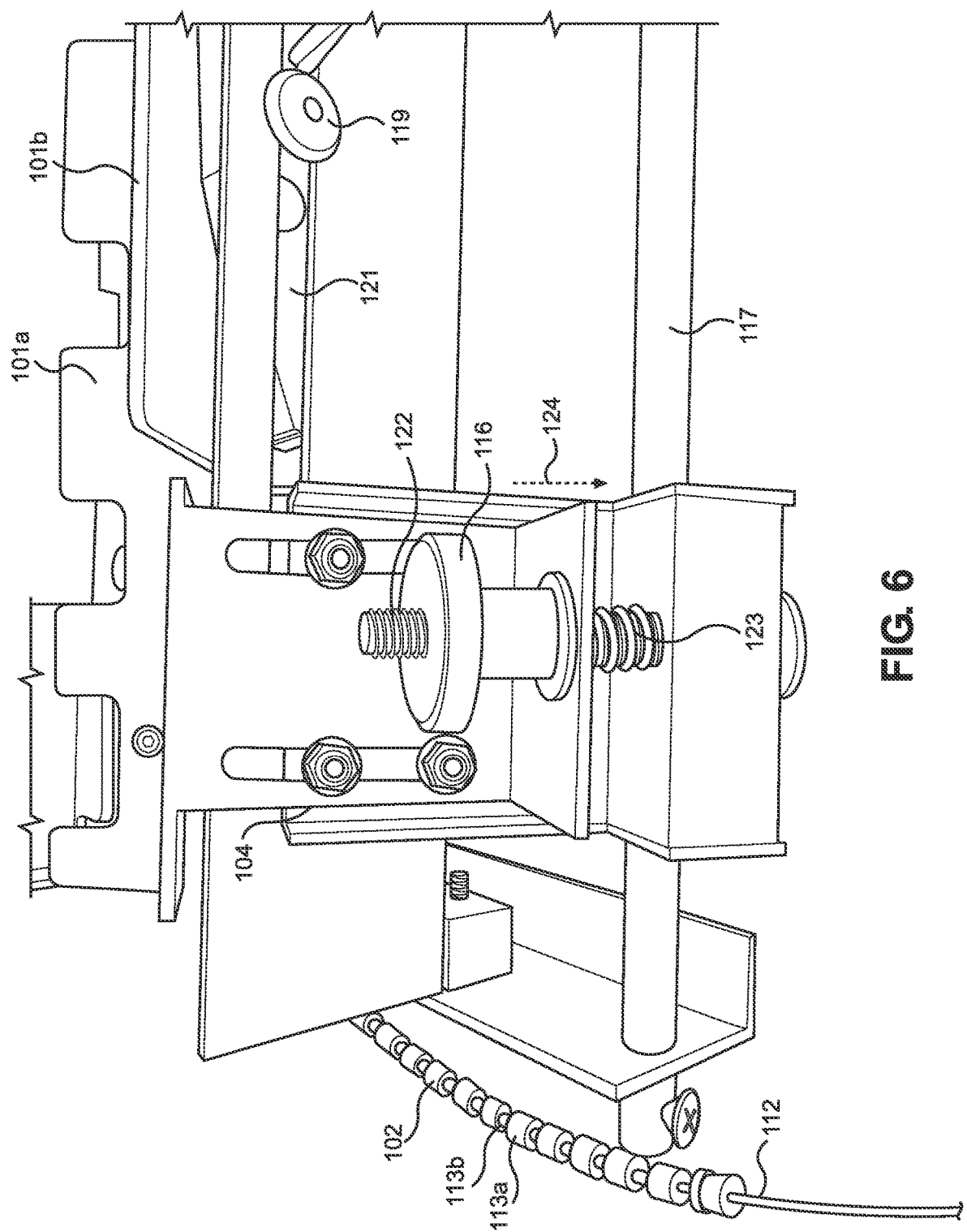
FIG. 6 shows a view of an example embodiment of a tensioning member for the example embodiment of the rotating-machine holding apparatus shown in FIG. 1.
Figure 7:
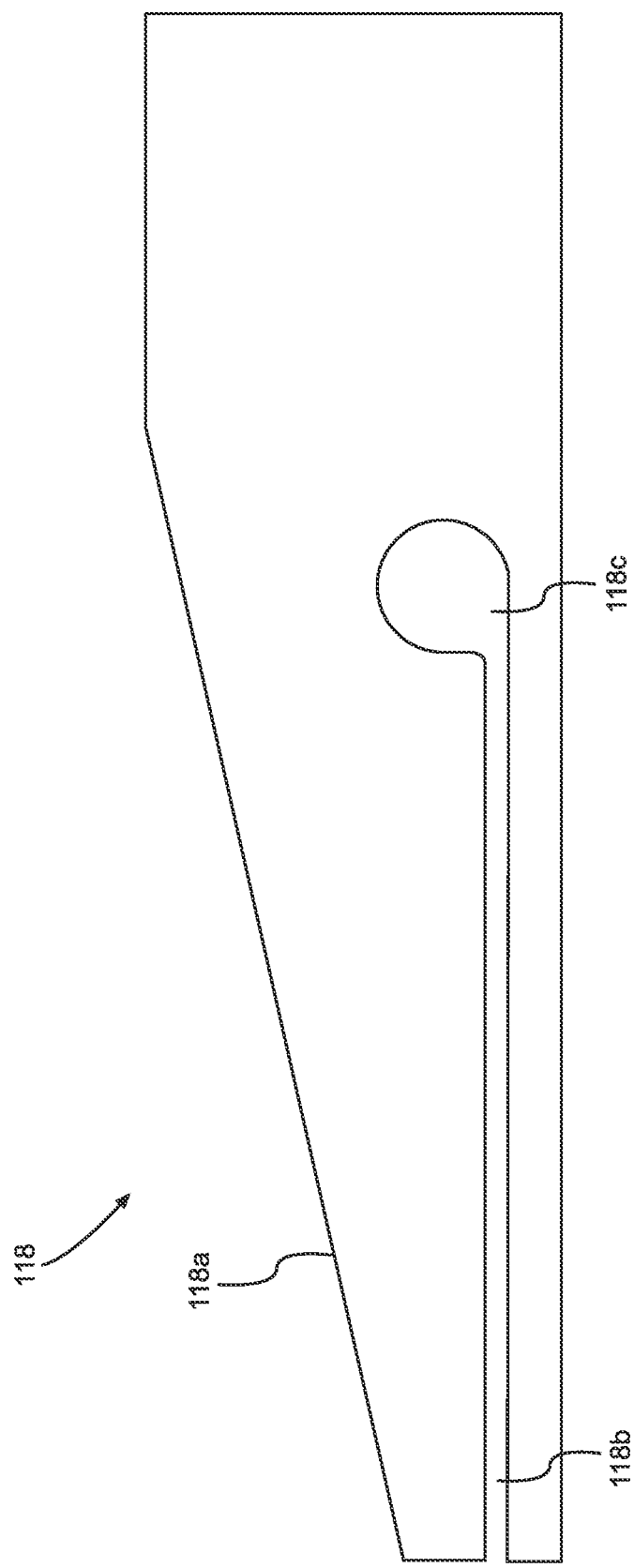
FIG. 7 depicts a side view of an example embodiment of a wedge body according to the subject matter disclosed herein.

FIG. 1 shows a front-side perspective view of a first example embodiment of a rotating-machine test fixture 100 according to the subject matter disclosed herein. FIG. 2 shows a top view of the example embodiment of the rotating-machine test fixture 100 shown in FIG. 1. FIG. 3 shows a backside perspective view of the example embodiment of the rotating-machine test fixture 100 shown in FIG. 1. FIG. 4 shows a right end view of the example embodiment of the rotating-machine test fixture 100 shown in FIG. 1. FIG. 5 shows a left end view of the example embodiment of the rotating-machine test fixture 100 shown in FIG. 1. FIG. 6 shows a view of an example embodiment of a tensioning member 104 for the example embodiment of the rotating-machine test fixture 100 shown in FIG. 1. FIG. 7 depicts a side view of an example embodiment of a wedge body 118 for a wedge member 103 according to the subject matter disclosed herein.

The rotating-machine test fixture 100 may be used to hold a rotating machine, such as an alternator, a generator or a starting motor, for testing. The example embodiment of a rotating-machine test fixture 100 may be described herein in connection with an alternator, however, it should be kept in mind that the rotating-machine test fixture 100 may alternatively receive and hold a generator or a starting motor. It should also be kept in mind that the embodiments of the rotating-machine test fixture disclosed herein are scalable in size so that different size ranges of rotating machines may be received and held by a rotating-machine test fixture.

Referring to FIGS. 1-7 and 14-16, the rotating-machine test fixture 100 may include a base 101 that receives a rotating machine, a flexible member 102 that holds a received rotating machine against the base 101, and a wedge member 103 that provides support for a rotating machine that has been received by the base 101. The rotating-machine test fixture 100 may also include a flexible-member tensioner 104 and a belt-drive tensioner 105. In one embodiment, the rotating-machine test fixture 100 may be attached to a larger chassis or structure.

The base 101 may include a first angled support member 101a and a second angled support member 101b that are attached to the base 101. In an alternative embodiment, the base 101, the first angled support member 101a and the second angled support member 101b may be formed to be a unitary structure. The base 101, the first angled support member 101a and the second angled support member 101b for a channel 128 that is oriented along a longitudinal axis 108 that may receive a rotating machine, such as an alternator, a generator, or a starter motor. In one embodiment, the base may be configured to include one angled support member 101a or 101b. In the example embodiment shown in FIGS. 1-6, the base may be configured to include the first angled support member 101a and the second angled support member 101b.

In one embodiment, alternators and/or generators may, for example, be received and held towards a first end 106 of the base 101 in the channel 128. Starter motors may, for example, be received and held in the channel 128 so that the starter-motor gear may be oriented toward a second end 107 of the base 101 that is opposite the first end. Alternatively, a starter motor may be received and held so that the starter-motor gear may be oriented toward the first end 106. When a rotating machine is placed on, or received by, the base 101, the axis of rotation of the rotating machine is substantially aligned with the longitudinal axis 108 of the base 101.

For alternators (and/or generators), the flexible member 102 may be positioned and arranged across the received alternator, and engaged with the flexible-member tensioner 104. A first end 109 of the flexible member 102 may be coupled to a slidable member 110. The slidable member 110 slidably engages a first bar member 111 so that the first slidable member 110 may slide along the length of the first bar member 111. In one embodiment, the flexible member 102 may include a cable portion 112, and a plurality of different diameter segments 113a and 113b, of which only one segment 113a and one segment 113b are indicated. The segments 113a and 113b are arranged in an alternating manner along the cable member 112. A segment 113a may include a first diameter that is substantially traverse a width of the cable member 112, and a segment member 113b may include a second diameter that is also substantially traverse the width of the cable member 112. The first diameter may be greater than the second diameter. In one embodiment, a length of a segment 113a may be ³⁄₁₆ inches so that segment members 113b are ³⁄₁₆ inches apart, which makes for a large number of choices for engaging the flexible member in the slot 114 of the flexible-member tensioner 104. Alternative embodiments may include different diameter spherically shaped segments. A segment 113a is positioned to engage a slot 114 of the flexible-member tensioner 104. (See, for example, 115 in FIGS. 14-16.)

In one embodiment, the flexible-member tensioner 104 may include the slot 114 and a tension adjuster 116. The flexible-member tensioner 104 may be configured to slidably engage a second bar member 117 so that the flexible-member tensioner 104 may slide along the length of the second bar member 117. A position of the flexible-member tensioner 104 may be selected by a user so that the flexible member 102 may affirmatively and securely hold an alternator that has been received by the base 101. That is, the position of the flexible-member 102 and the flexible-member tensioner 104 may be adjusted and selected for the greatest actual integrity of the hold.

The wedge member 103 may be slidably positioned to engage and support a received alternator, thereby positioning the alternator so that the axis of rotation of the alternator may be substantially aligned with the longitudinal axis 108 of the base 101. In one embodiment, the wedge member 103 may include a wedge body 118 (FIG. 7), guide members 119, and a handle 120. The guide members 119 slidably engage a slot 121 in the base 101. A width of the slot 121 may be greater than a cross-sectional diameter of a guide member 119 where the guide member 119 passes through the slot 121 so that a force applied by the wedge member 103 to support a received alternator may cause the two guide members 119 to bind in the slot 121 and hold the supporting force provided by the wedge member 103.

FIG. 7 depicts a side view of an example embodiment of a wedge body 118 according to the subject matter disclosed herein. The example embodiment of the wedge body 118 may include an inclined surface 118a, a slot 118b, and an aperture 118c. The slot 118b and the aperture 118c may provide stress relief of the wedge member 103 for possible weak coverings at the rear of an alternator that may include plastic rear protection pieces. Holes for guide members 119 are not shown.

Figure 14:
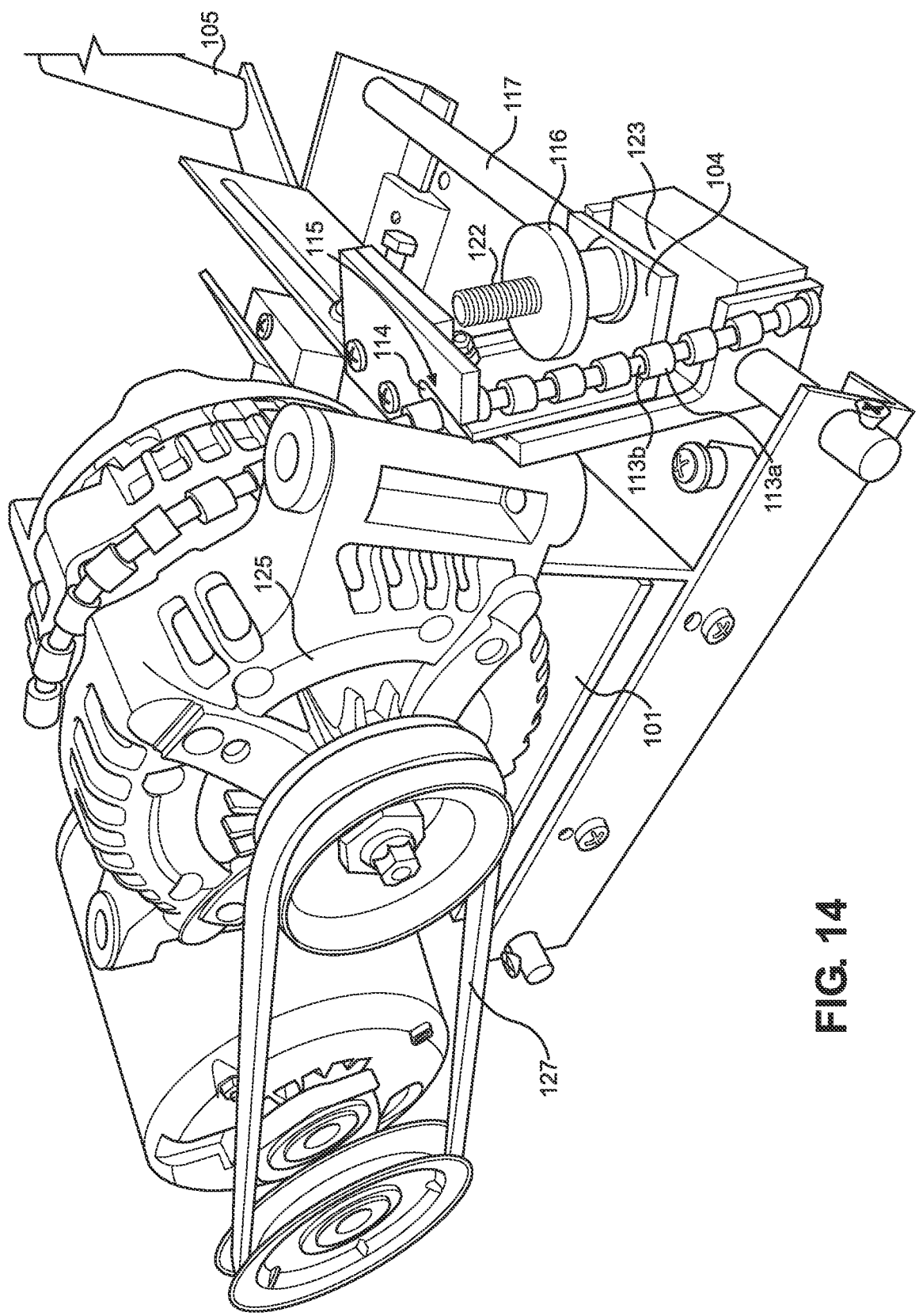
FIG. 14 shows a view of an example alternator being held in the example embodiment of the rotating-machine holding apparatus shown in FIG. 1.
Figure 15:
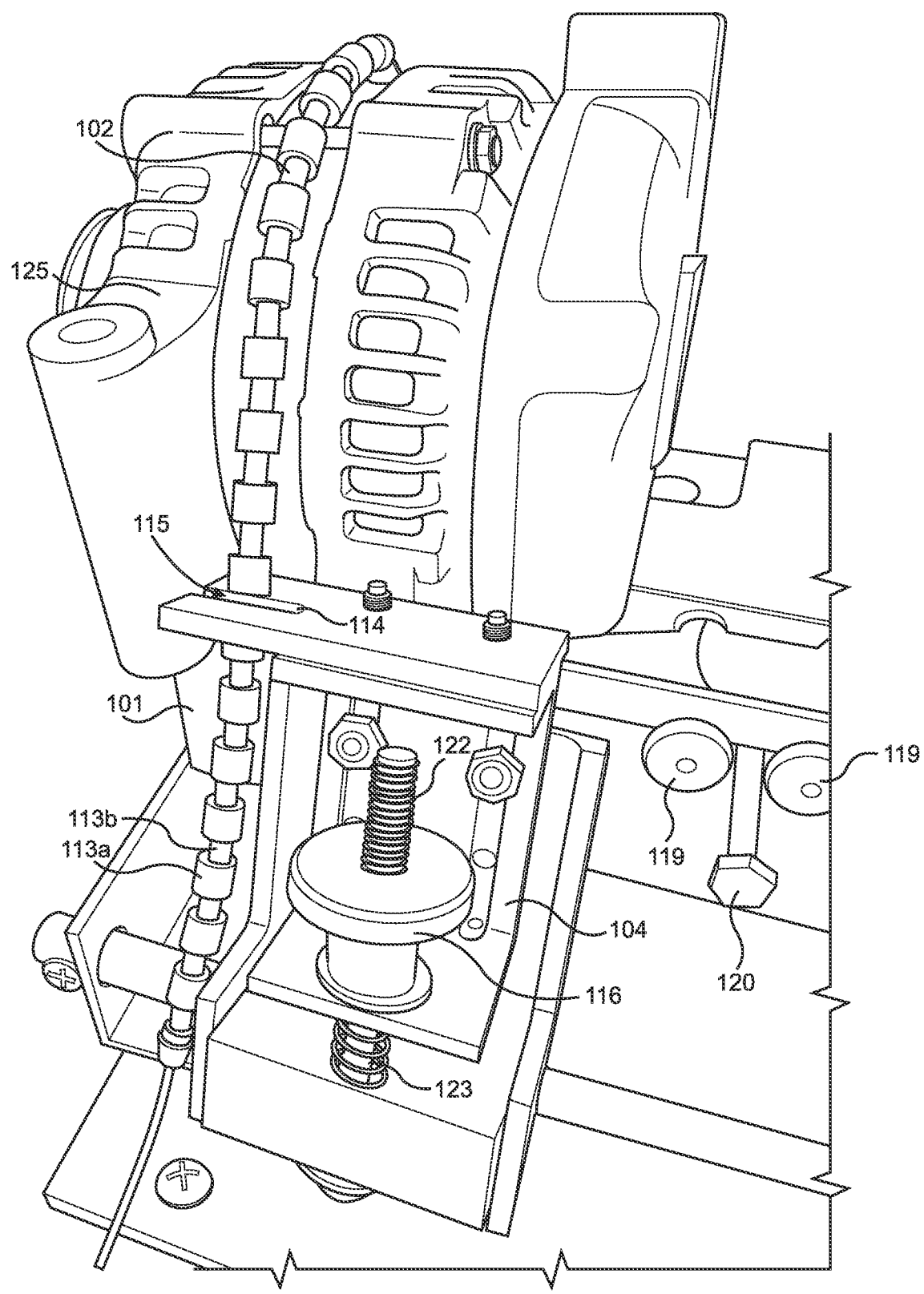
FIG. 15 shows a second view of the example alternator being held in the example embodiment of the rotating-machine holding apparatus shown in FIG. 1.
Figure 16:
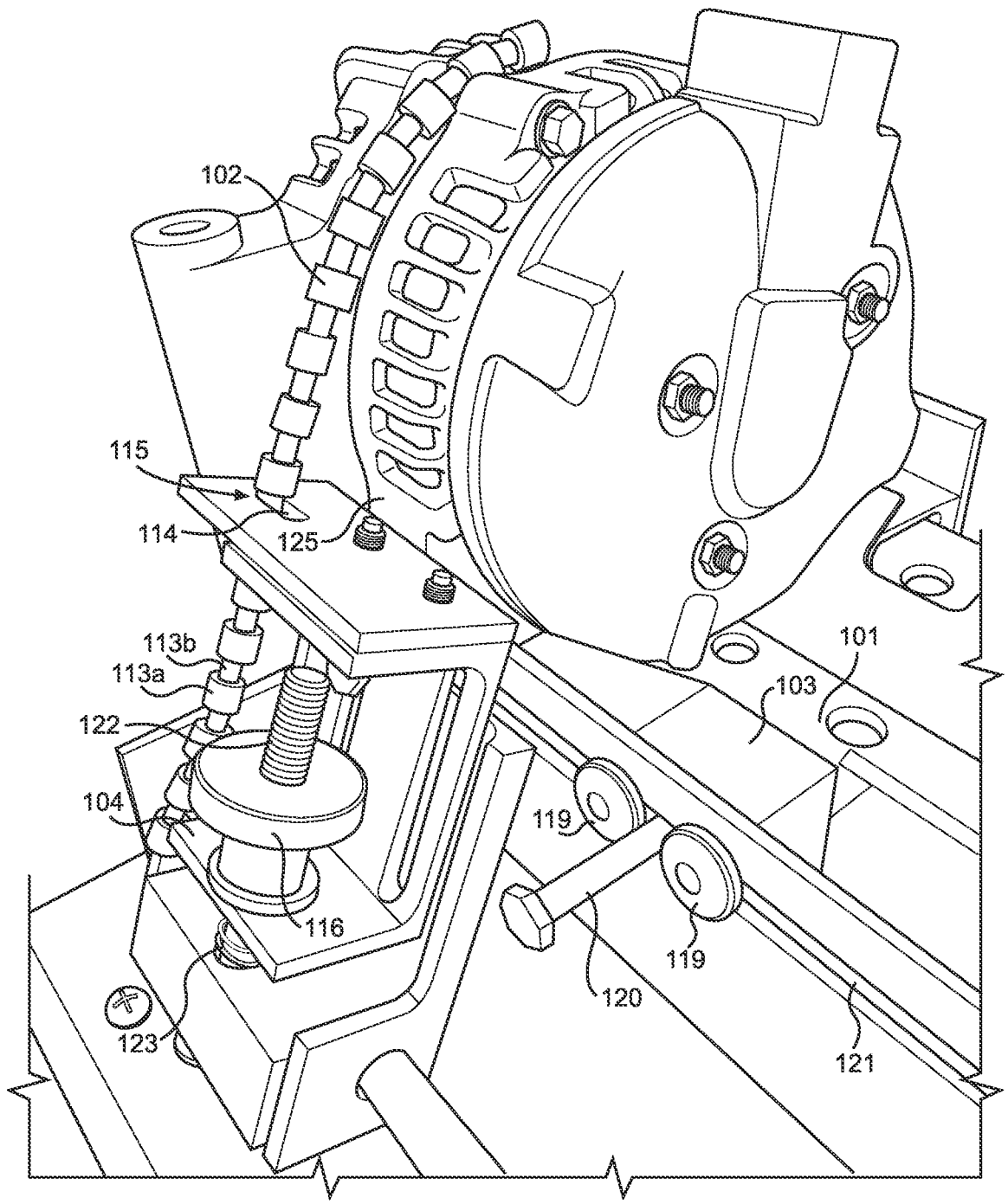
FIG. 16 shows a third view of the example alternator being held in the example embodiment of the rotating-machine holding apparatus shown in FIGS. 1.

After the flexible member 102 has been positioned to engage the slot 114 and the wedge member 103 has been positioned to support a received alternator, the tension adjuster 116 may be rotated about a threaded shaft 122 to compress a spring 123, thereby moving the flexible-member tensioner 104 in a downward direction, indicated at 124, and tightening the tension on the flexible member 102 so that the received alternator may be firmly held in the base 101. FIGS. 14-16 show an example alternator 125 being held in the example embodiment of the rotating-machine test fixture 100.

The positioning of the flexible member 102 across the alternator, the position of the slidable member 110, the position of the flexible-member tensioner 104, tension applied by the flexible-member tensioner 104, and/or the position of the wedge member 103 may be iteratively adjusted unit a received alternator is firmly held in position on the base 101.

Once an alternator has been firmly held in position on the base 101 and electrical connections have been made to the alternator, a belt-drive tensioner 105 may be moved, indicated at 126, to tighten a drive belt 127 (see, for example, FIG. 14) so that the alternator may be tested. In one embodiment, moving the belt-drive tensioner 105 may cause a driving motor to move so that the drive belt 127 is suitably tensioned. In another embodiment, moving the belt-drive tensioner 105 may cause a sheave (not shown) to press against and tension the drive belt 127.

Figure 8:
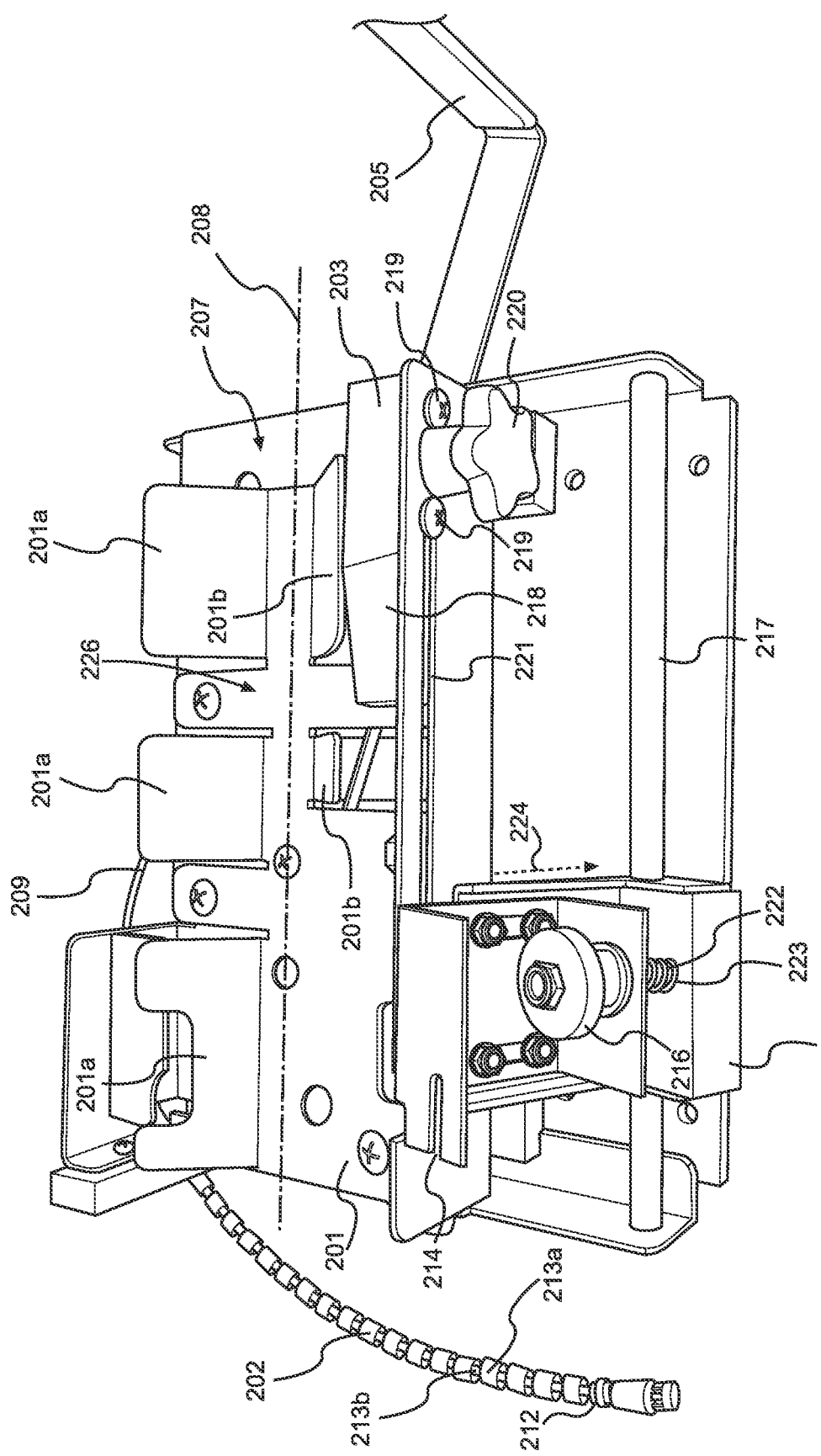
FIG. 8 shows a front-side perspective view of a second example embodiment of a rotating-machine test fixture according to the subject matter disclosed herein.
Figure 9:
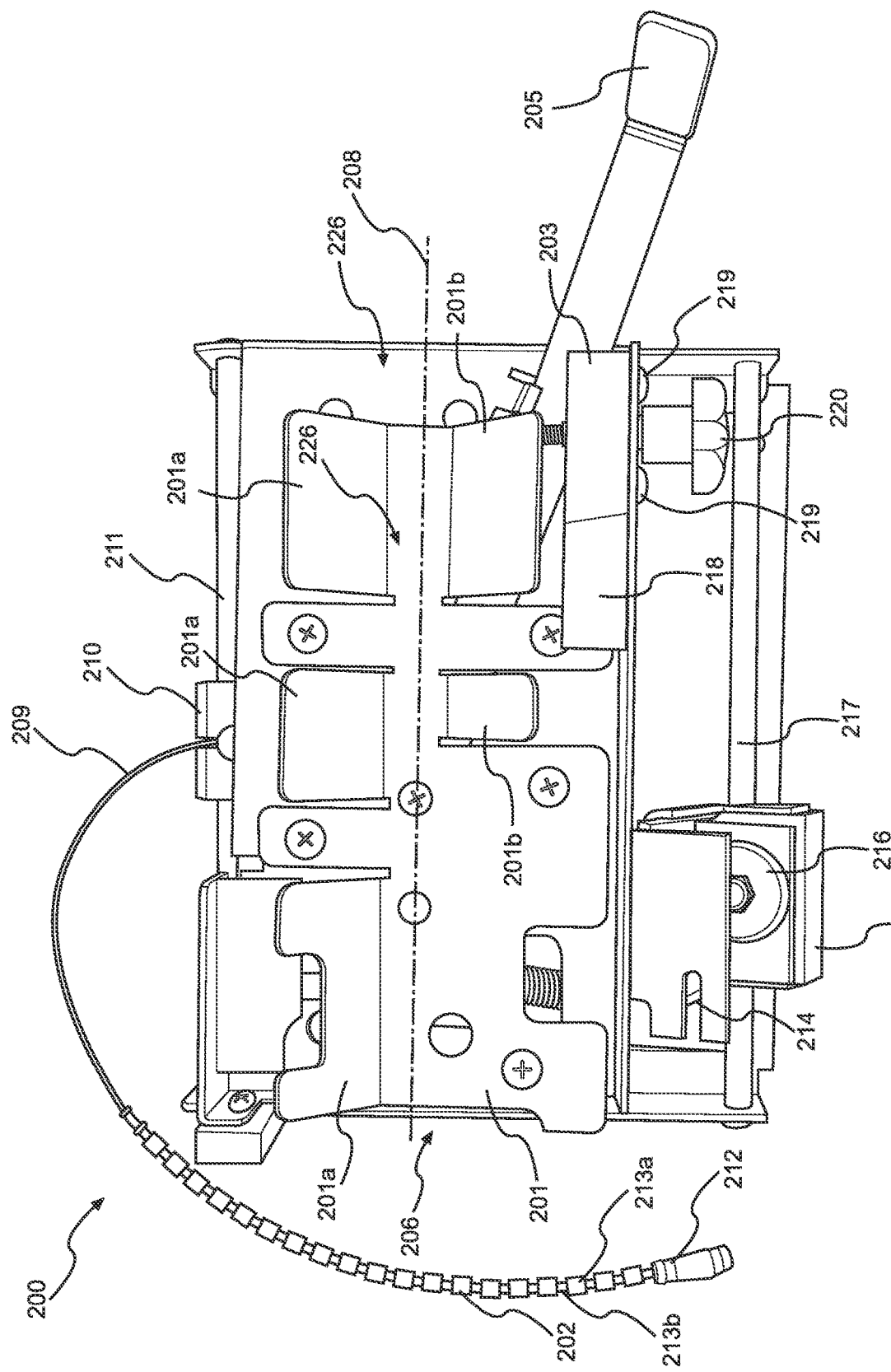
FIG. 9 shows a top view of the example embodiment of the rotating-machine test fixture shown in FIG. 8.
Figure 10:
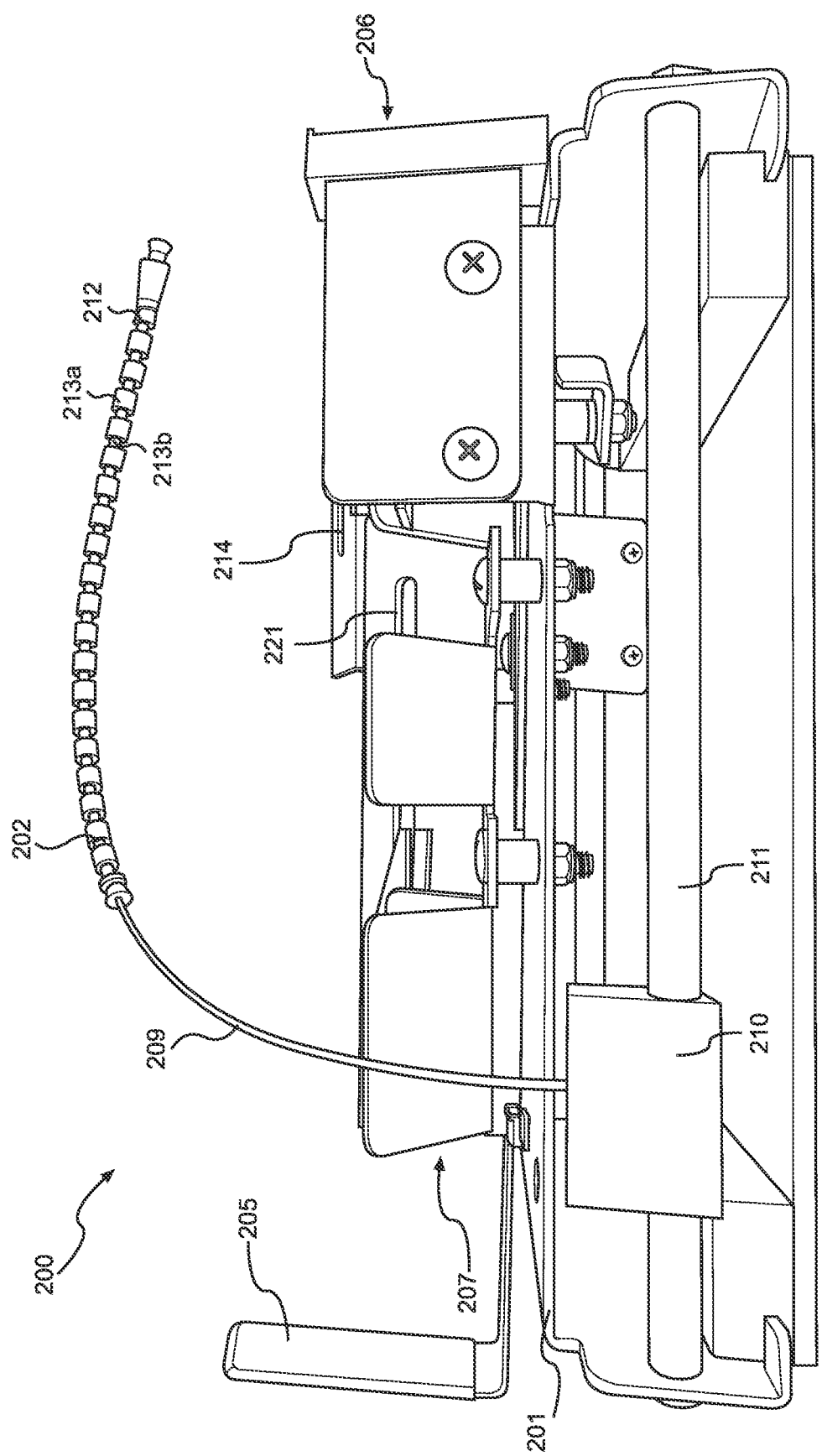
FIG. 10 shows a back view of the example embodiment of the rotating-machine test fixture shown in FIG. 8.
Figure 11:
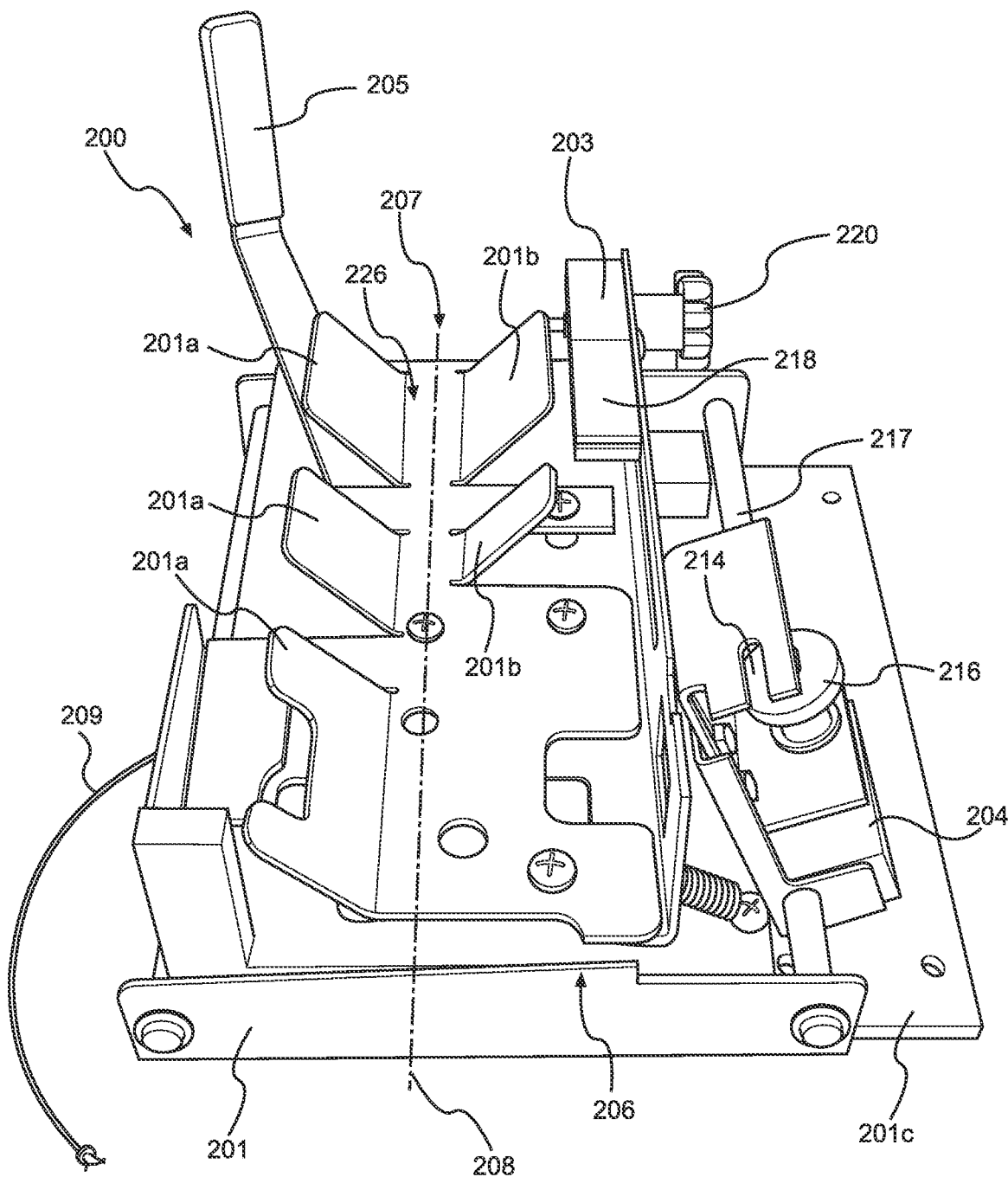
FIGS. 11 and 12 show a left end view of the example embodiment of the rotating-machine holding apparatus shown in FIG. 8.
Figure 12:
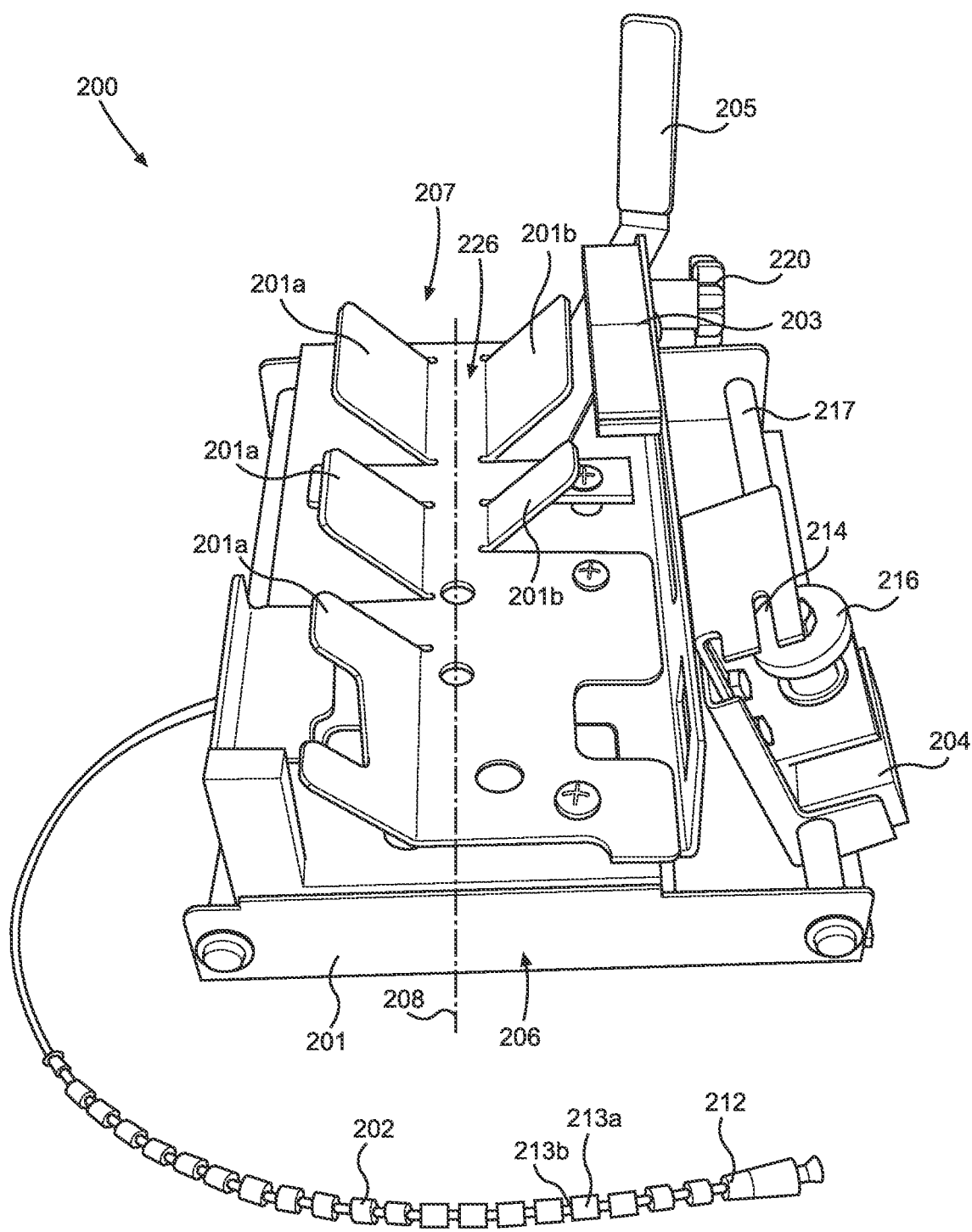
Figure 13:
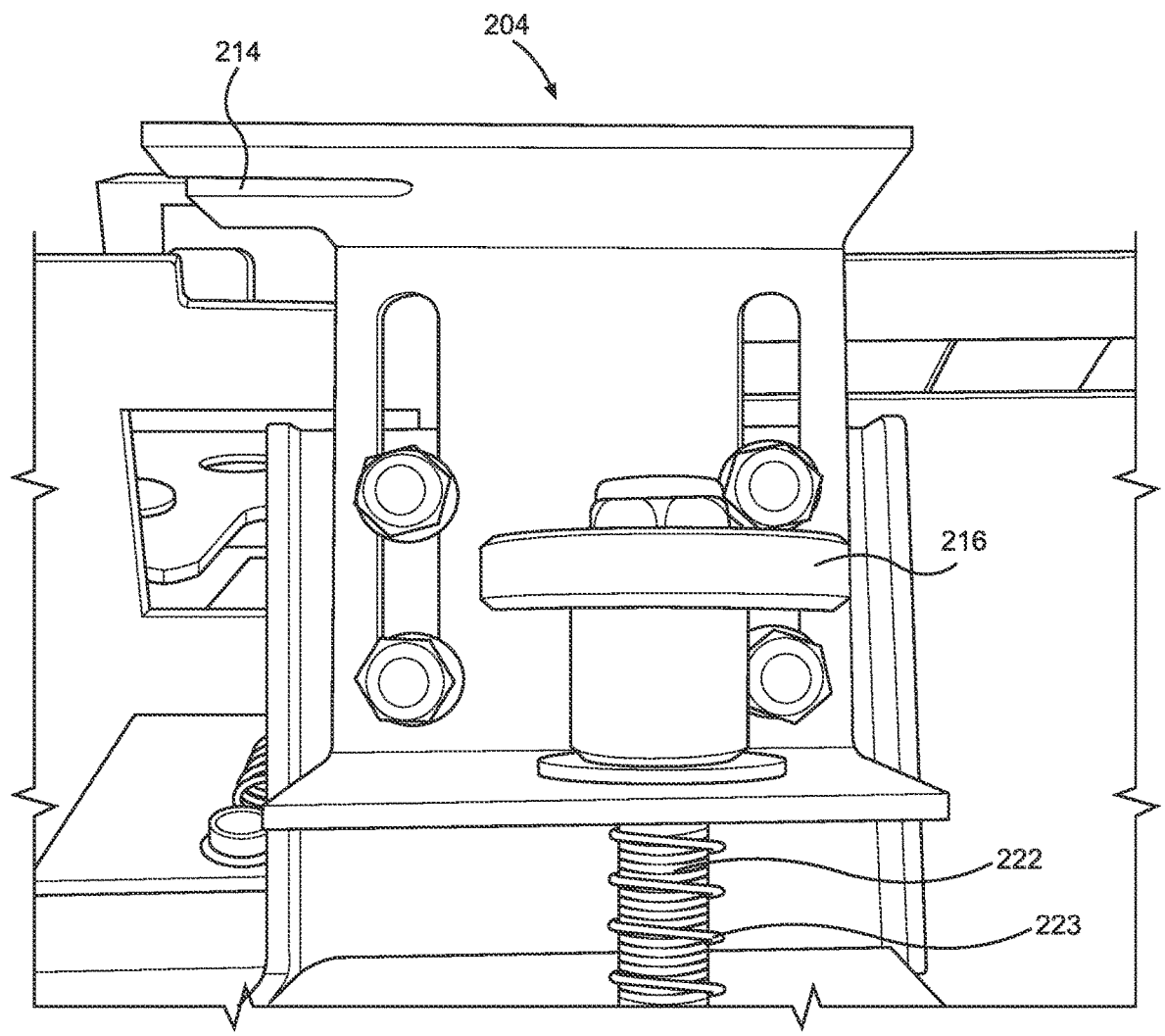
FIG. 13 shows a view of an example embodiment of a tensioning member for the example embodiment of the rotating-machine test fixture shown in FIG. 8.

FIG. 8 shows a front-side perspective view of a second example embodiment of a rotating-machine test fixture 200 according to the subject matter disclosed herein. FIG. 9 shows a top view of the example embodiment of the rotating-machine test fixture 200 shown in FIG. 8. FIG. 10 shows a back view of the example embodiment of the rotating-machine test fixture 200 shown in FIG. 8. FIGS. 11 and 12 show a left end view of the example embodiment of the rotating-machine holding apparatus 200 shown in FIG. 8. FIG. 13 shows a view of an example embodiment of a tensioning member 204 for the example embodiment of the rotating-machine test fixture 200 shown in FIG. 8.

Like the rotating-machine test fixture 100 shown in FIGS. 1-7, the rotating-machine test fixture 200 may be used to hold a rotating machine, such as an alternator, a generator or a starting motor, for testing. Moreover, the example embodiment of a rotating-machine test fixture 200 may be described herein in connection with an alternator, however, it should be kept in mind that the rotating-machine test fixture 200 may alternatively receive and hold a generator or a starting motor.

Referring to FIGS. 8-13, the rotating-machine test fixture 200 may include a base 201 that receives a rotating machine, a flexible member 202 that holds a received rotating machine against the base 201, and a wedge member 203 that provides support for a rotating machine that has been received by the base 201. The rotating-machine test fixture 200 may also include a flexible-member tensioner 204 and a belt-drive tensioner 105. In one embodiment, the rotating-machine test fixture 200 may be attached to a larger chassis or structure.

The base 201 may include a first angled support member 201a and a second angled support member 201b that are attached to the base 201. In an alternative embodiment, the base 201, the first angled support member 201a and the second angled support member 201b may be formed to be a unitary structure. The base 201, the first angled support member 201a and the second angled support member 201b for a channel 226 that is oriented along a longitudinal axis 208 that may receive a rotating machine, such as an alternator, a generator, or a starter motor. In one embodiment, the base may be configured to include one angled support member 201a or 201b. In the example embodiment shown in FIGS. 8-13, the base may be configured to include the first angled support member 201a and the second angled support member 201b.

In one embodiment, alternators and/or generators may, for example, be received and held towards a first end 206 of the base 201 in the channel 226. Starter motors may, for example, be received and held in the channel 226 so that the starter-motor gear may be oriented toward a second end 207 of the base 201 that is opposite the first end. Alternatively, a starter motor may be received and held so that the starter-motor gear may be oriented toward the first end 206. When a rotating machine is placed on, or received by, the base 201, the axis of rotation of the rotating machine is substantially aligned with the longitudinal axis 208 of the base 201.

For alternators (and/or generators), the flexible member 202 may be positioned and arranged across the received alternator, and engaged with the flexible-member tensioner 204. A first end 209 of the flexible member 202 may be coupled to a slidable member 210. The slidable member 210 slidably engages a first bar member 211 so that the first slidable member 210 may slide along the length of the first bar member 211. In one embodiment, the flexible member 202 may include a cable portion 212, and a plurality of different diameter segments 213a and 213b, of which only one segment 213a and one segment 213b are indicated. The segments 213a and 213b are arranged in an alternating manner along the cable member 212. A segment 213a may include a first diameter that is substantially traverse a width of the cable member 212, and a segment member 213b may include a second diameter that is also substantially traverse the width of the cable member 212. The first diameter may be greater than the second diameter. Alternative embodiments may include different diameter spherically shaped segments. A segment 213a is positioned to engage a slot 214 of the flexible-member tensioner 204. (See 115 in FIGS. 14-16.)

In one embodiment, the flexible-member tensioner 204 may include the slot 214 and a tension adjuster 216. The flexible-member tensioner 204 may be configured to slidably engage a second bar member 217 so that the flexible-member tensioner 204 may slide along the length of the second bar member 217. A position of the flexible-member tensioner 204 may be selected by a user so that the flexible member 202 may affirmatively and securely hold an alternator that has been received by the base 201. That is, the position of the flexible-member 202 and the flexible-member tensioner 204 may be adjusted and selected for the greatest actual integrity of the hold.

The wedge member 203 may be slidably positioned to engage and support a received alternator, thereby positioning the alternator so that the axis of rotation of the alternator may be substantially aligned with the longitudinal axis 208 of the base 201. In one embodiment, the wedge member 203 may include a wedge body 218 (see, for example, FIG. 7), guide members 219, and a handle 220. The guide members 219 slidably engage a slot 221 in the base 201. A width of the slot 221 may be greater than a cross-sectional diameter of a guide member 219 where the guide member 219 passes through the slot 221 so that a force applied by the wedge member 203 to support a received alternator may cause the two guide members 219 to bind in the slot 221 and hold the supporting force provided by the wedge member 203. The handle 220 may be tightened against the base 201 for additional integrity for the supporting force provided by the wedge member 203.

Similar to the first embodiment of the rotating-machine test fixture 100 shown in FIGS. 1-6, after the flexible member 202 has been positioned to engage the slot 214 and wedge member 203 has been positioned to support a received alternator, the tension adjuster 216 may be rotated about a threaded shaft 222 to compress a spring 223, thereby moving the flexible-member tensioner 204 in a downward direction, indicated at 224, and tightening the tension on the flexible member 202 so that the received alternator may be firmly held in the base 201. FIGS. 14-16 show an example alternator 125 being held in the first example embodiment of the rotating-machine test fixture 100.

The positioning of the flexible member 202 across the alternator, the position of the slidable member 210, the position of the flexible-member tensioner 204, tension applied by the flexible-member tensioner 204, and/or the position of the wedge member 203 may be iteratively adjusted unit a received alternator is firmly held in position on the base 201.

Once an alternator has been firmly held in position on the base 201 and electrical connections have been made to the alternator, a belt-drive tensioner 205 may be moved, indicated at 226, to tighten a drive belt 127 (see, for example, FIG. 14) so that the alternator may be tested. In one embodiment, moving the belt-drive tensioner 205 may cause a driving motor to move so that the drive belt 127 is suitably tensioned. For example, the belt-drive tensioner 205 is shown in FIG. 11 in a position prior to tightening a belt drive. The base 201 may be seen as being positioned toward the left in the figure above a base plate 201c. In FIG. 12, the belt-drive tensioner 205 is shown in a position that provides tension to a belt drive. The base 201, in FIG. 12, is positioned above the base plate 201c (not shown in FIG. 12). In another embodiment, moving the belt-drive tensioner 205 may cause a sheave (not shown) to press against and tension the drive belt 127.

Figure 17:
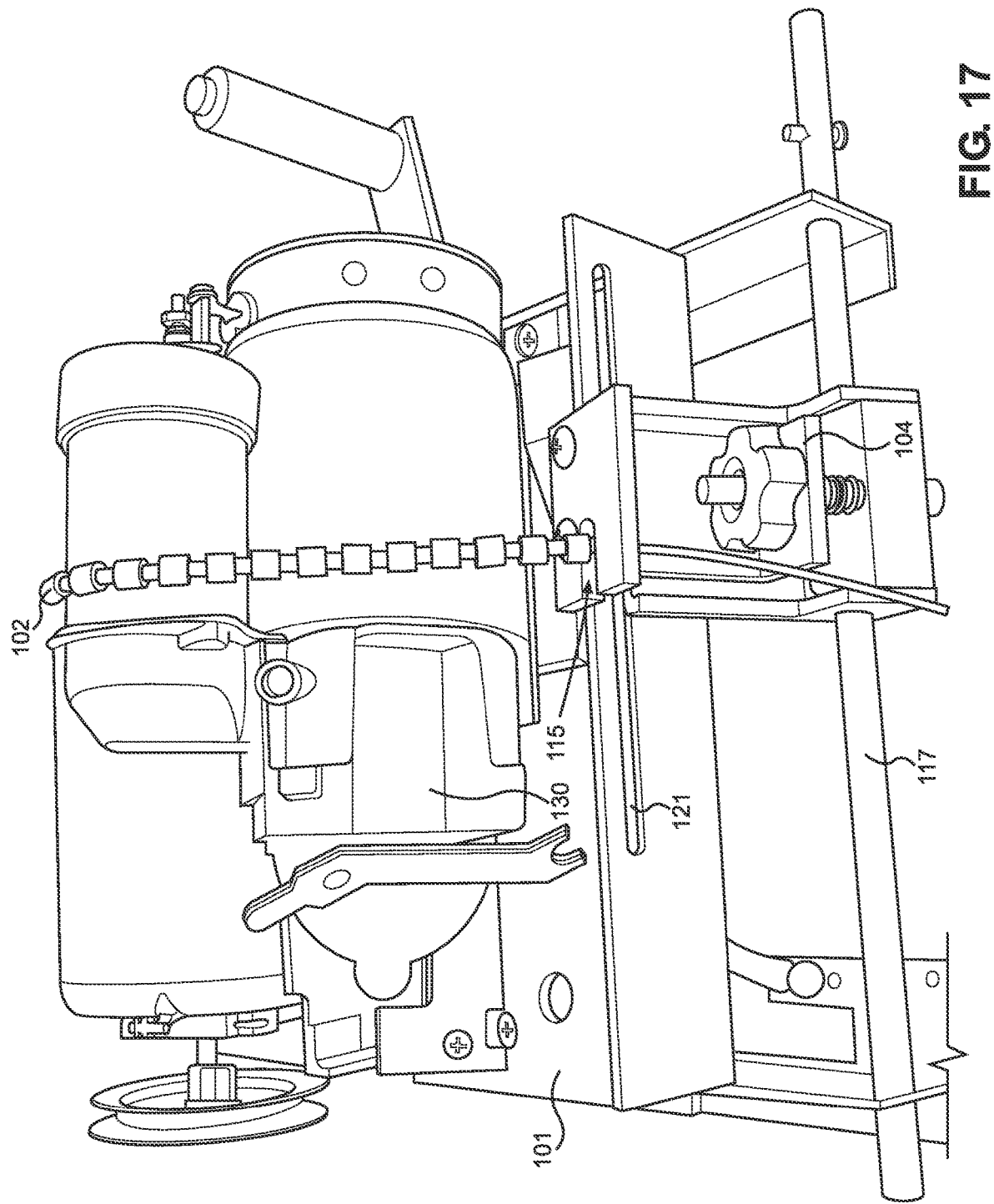
FIG. 17 shows a view of an example starter motor being held in the example embodiment of the rotating-machine holding apparatus shown in FIG. 1.

FIG. 17 shows a view of an example starter motor 130 being held in the first example embodiment of the rotating-machine holding apparatus 100 shown in FIG. 1. In one embodiment, a starter motor 130 may be held by the rotating-machine holding apparatus 100 to position the starter motor so that the starter-motor drive gear may be positioned at the second end 107 of the rotating-machine holding apparatus 100. Alternatively, a starter motor may be received and held so that the starter-motor gear may be oriented toward the first end 106. The flexible member 102 is positioned and arranged across the received starter motor and engaged with the flexible-member tensioner 104. The slidable capabilities of slidable member 110 and the flexible-member tensioner 104 allow the flexible member 102 to be suitably positioned to firmly hold a received starter motor. After a starter motor has been firmly held against the base 101, electrical connections may be made to the starter motor and the starter motor may be tested.

Although the foregoing disclosed subject matter has been described in some detail for purposes of clarity of understanding, it will be apparent that certain changes and modifications may be practiced that are within the scope of the appended claims. Accordingly, the present embodiments are to be considered as illustrative and not restrictive, and the subject matter disclosed herein is not to be limited to the details given herein, but may be modified within the scope and equivalents of the appended claims.

What is claimed is:

1. A rotating-machine test fixture, comprising:
 a base comprising a longitudinal axis, the base receiving a rotating machine so that an axis of rotation of the rotating machine is aligned in a first direction that is substantially parallel to the longitudinal axis of the base;

a flexible member comprising a first end and a second end, the first end being attached to the base at a first location and the second end being slidably attached to the base at a second location to hold the received rotating machine against the base, the flexible member extending in a second direction that is transverse to the longitudinal axis; and a wedge member that moves with respect to the base in the first direction that is substantially parallel to the longitudinal axis of the base, the wedge member being selectably positioned between the received rotating machine and the base to align the axis of rotation of the rotating machine to be substantially parallel to the longitudinal axis of the base.

2. The rotating-machine test fixture of claim 1, wherein the base is movable to adjust a position of a received rotating machine with respect to a driver of a belt coupled to the received rotating machine.

3. The rotating-machine test fixture of claim 1, wherein the base includes one or more support members that form a channel that receives the rotating machine, the channel being oriented in the first direction that is substantially parallel to the longitudinal axis of the base.

4. The rotating-machine test fixture of claim 1, wherein the received rotating machine comprises an alternator.

5. The rotating-machine test fixture of claim 1, wherein the received rotating machine comprises a starter motor.

6. The rotating-machine test fixture of claim 1, further comprising a flexible-member tensioner that receives the flexible member and that slidably attaches to the base along the first direction that is substantially parallel to the longitudinal axis of the base, the flexible-member tensioner selectably increasing a tension of the flexible member as the flexible member holds the received rotating machine.

7. The rotating-machine test fixture of claim 6, wherein the first end is slidably attached to the base along the first direction that is substantially parallel to the longitudinal axis of the base.

8. A rotating-machine test fixture, comprising:

a base includes one or more support members that form a channel that is oriented substantially parallel to a longitudinal axis of the base, the base receiving a rotating machine so that an axis of rotation of the rotating machine is aligned in a first direction that is substantially parallel to the longitudinal axis of the base;

a flexible member comprising a first end and a second end, the first end being attached to the base at a first location and the second end being slidably attached to the base at a second location to hold the received rotating machine against the base, the flexible member extending in a second direction that is transverse to the longitudinal axis; and a wedge member that moves with respect to the base in the first direction that is substantially parallel to the longitudinal axis of the base, the wedge member being selectably positioned between the received rotating machine and the base to align the axis of rotation of the rotating machine to be substantially parallel to the longitudinal axis of the base.

9. The rotating-machine test fixture of claim 8, wherein at least one support member is sloped with respect to the base.

10. The rotating-machine test fixture of claim 8, wherein the base is movable to adjust a position of a received rotating machine with respect to a driver of a belt coupled to the received rotating machine.

11. The rotating-machine test fixture of claim 8, wherein the channel is oriented in the first direction that is substantially parallel to the longitudinal axis of the base.

12. The rotating-machine test fixture of claim 8, wherein the received rotating machine comprises an alternator.

13. The rotating-machine test fixture of claim 8, wherein the received rotating machine comprises a starter motor.

14. The rotating-machine test fixture of claim 8, further comprising a flexible-member tensioner that receives the flexible member and that slidably attaches to the base along a direction that is substantially parallel to the longitudinal axis of the base, the flexible-member tensioner selectably increasing a tension of the flexible member as the flexible member holds the received rotating machine.

15. The rotating-machine test fixture of claim 14, wherein the first end is slidably attached to the base along the first direction that is substantially parallel to the longitudinal axis of the base.

16. A rotating-machine test fixture, comprising:

a base includes one or more support members that form a channel that is oriented substantially parallel to a longitudinal axis of the base, the base receiving a rotating machine so that an axis of rotation of the rotating machine is aligned in a first direction that is substantially parallel to the longitudinal axis of the base;

a flexible member comprising a first end and a second end, the first end being attached to the base at a first location and the second end being slidably attached to the base at a second location to hold the received rotating machine against the base, the flexible member extending in a direction that is transverse to the longitudinal axis;

a flexible-member tensioner that receives the flexible member and that slidably attaches to the base along the first direction that is substantially parallel to the longitudinal axis of the base, the flexible-member tensioner selectably increasing a tension of the flexible member as the flexible member holds the received rotating machine; and a wedge member that moves with respect to the base in the first direction that is substantially parallel to the longitudinal axis of the base, the wedge member being selectably positioned between the received rotating machine and the base to align the axis of rotation of the rotating machine to be substantially parallel to the longitudinal axis of the base.

17. The rotating-machine test fixture of claim 16, wherein the first end is slidably attached to the base along the first direction that is substantially parallel to the longitudinal axis of the base.

18. The rotating-machine test fixture of claim 17, wherein the base is movable to adjust a position of a received rotating machine with respect to a driver of a belt coupled to the received rotating machine.

19. The rotating-machine test fixture of claim 18, wherein the received rotating machine comprises an alternator.

20. The rotating-machine test fixture of claim 18, wherein the received rotating machine comprises a starter motor.

* * * * *